3,288,551
PROCESS FOR THE COLORING OF FIBER BLENDS OF POLYESTER AND NATIVE OR REGENERATED CELLULOSE
Fritz Raff, Oradell, N.J., assignor to Ciba Corporation, New York, N.Y., a corporation of Delaware
No Drawing. Filed Aug. 8, 1963, Ser. No. 300,911
6 Claims. (Cl. 8—21)

This application is a continuation-in-part of application Serial No. 272,205, filed April 11, 1963, and now abandoned.

There are several processes known for dyeing and printing fiber blends of polyester and native or regenerated cellulose. In these processes there are used e.g. pigmented resins, selected vat dyestuffs having affinity for both fibers, blends of vat dyestuffs with dispersed dyestuffs, blends of fiber reactive dyestuffs with dispersed dyestuffs, blends of dispersed dyestuffs with direct dyestuffs or finally azoic coupling compounds.

Because of the considerable differences in the physical and chemical properties of the two fibers present in these blends, as well as of the dyestuffs present in the dyestuff mixtures applied to the blends, such processes involve a number of problems and difficulties which do not arise in the application of single dyestuffs to homogeneous fibers.

E.g. the conditions in the printing paste or in the dyeing bath, which may be suitable for the dyestuff on the cellulosic fiber, may affect the stability of the dyestuff on the polyester fiber; or they may be suitable for the dyestuff on the cellulosic fiber but negatively influence, e.g. the affinity of the dyestuff on the polyester fiber; or they may be suitable for the polyester fiber but produce an unfavorable staining of the cellulose fiber. Such differences get still more pronounced under the conditions used for the fixation of the dyestuffs. E.g. the presence of alkali, which is necessary to bind chemically the reactive cotton dyestuff, may have a very negative effect on the disperse color dispersion at higher temperatures. The same negative effect may be true of other electrolytes. High amounts of urea, as necessary especially for thermofixation on blends with regenerated cellulose may cause excessive disperse color stain on this portion of the fiber blend with subsequent loss on color strength on the polyester portion of the blend. Furthermore, at the temperatures used for thermofixation, alkali and urea, when present together, may react with each other to form certain reaction products which adversely affect many disperse colors. Or, in order to prevent premature hydrolysis of the reactive dyestuff, the impregnation with alkali necessary to chemically fix the reactive dye on the fiber may be performed after the dry-heat fixation of the dyestuff for the polyester fiber. However, if blend fibers are exposed afterwards to a steam-treatment (flash aging), staining of the white grounds may occur because of contamination of the chemical padding solution from the dyestuffs already brought onto the fiber.

For reason of the above-mentioned difficulties, as well as other ones, the attempts to dye or print mixed fabrics of the herein-discussed type have generally many undesirable limitations from the commercially acceptable viewpoint. The instant invention therefore relates to new methods of coloring, i.e. dyeing and printing blends of polyester and cellulosic fibers, more especially to a process, wherein a mixture of a disperse dyestuff and a water-soluble reactive dyestuff is applied to said fiber blends, which new methods lead to highly improved results.

The invention is based on the observation that the addition of the salts of certain halogenated aliphatic acids, preferably at least di-α-halogenated lower alkanoic acids, as e.g. trifluoroacetic acid, trichloroacetic acid and tribromoacetic acid, to the dyeing bath or the printing paste not only leads to the avoidance of most of the above-mentioned difficulties, but at the same time also positively influences the dyeing and printing process in different respects.

More especially the invention relates to a new coloring process for mixed textile materials comprising fibers of synthetic polymeric polyester materials and fibers of polyhydroxylated materials, which comprises applying thereto a coloring composition containing a disperse dye capable of dyeing the polyester fiber, a water-soluble reactive dye containing a reactive group capable of reacting with the polyhydroxylated fiber and the salt of an at least di-α-halogenated lower alkanoic acid and subsequently subjecting the fiber to the action of heat in order to fix the dyestuffs on the fiber blend.

The impregnating solutions or printing pastes used in the instant process may, of course, contain further additives generally used in dyeing or printing, e.g. wetting or dispersing agents, conventional thickeners such as alginates, tragacanth or carboxymethylcellulose, as well as further substances, e.g. hydrotropic products. Furthermore, they may contain electrolytes, e.g. sodium chloride, sodium acetate, etc. To prevent undesirable reduction phenomena, use may be made of conventional additives, such as alkali salts of meta-nitrobenzene sulfonic acid.

Especially useful additives for printing pastes have been found to be non-ionic dispersants based on adducts of high amounts of ethylene oxide with high molecular aliphatic alcohols, cross-linked with substituted isocyanates, e.g. the adduct of 80 mols of ethyleneoxide with 1 mol of oleylalcohol, cross-linked with approximately 1% of hexamethylene-diisocyanate-(1,6). Such condensation products are described in the French Patent No. 1,157,828. They have been found to have a solubilizing effect on the dispersed dyes. This effect, combined with the effect of the salts of the above-mentioned halogenated aliphatic acids, additionally promotes the absorption of the dispersed dye by the fiber. Further, said dispersants are eminently suitable for emulsification of the hydrocarbon solvents used in the preparation of emulsion thickeners for printing.

The proportions of the dyestuffs and the salts of halogenated aliphatic acids, as well as of any further assistants, may vary within wide limits. The proportions of the dyestuffs depend substantially on the desired strength of the tint. As a typical example of a print color paste, the following can be mentioned:

90 parts stock emulsion
X parts dispersed and reactive dyes sprinkled in
Y parts water to make up
—
100 parts by weight wherein the above-mentioned stock emulsion advantageously has the following composition:

500–800 parts water
    0.1 part preservative
 20– 40 parts alkali salt of the halogenated aliphatic acid
  5– 10 parts sodium salt of meta-nitrobenzene sulfonic acid
  5– 10 parts non-ionic dispersant
 80–120 parts white mineral spirits
 15– 20 parts low viscosity sodium alginate
 15– 30 parts carboxy methylated locust bean gum
 40–200 parts urea 1000 parts total When using vat dyestuffs, the process may be performed in the presence of a conventional reducing agent, such as sodium hydrosulfite, thioureadioxide, sodium sulfide or sodium sulfoxylate.

The aqueous preparations may be applied to the fibrous material in the known manner, advantageously at room temperature or at a moderately raised temperature, e.g. from 10°–40° C. The process is particularly suitable for continuous performance, e.g. for roller printing or padding fabrics. The impregnation is usually followed by squeezing the fabric in the conventional manner, advantageously to a weight increase of 50 to 100%.

After the preparations have been applied to the fibrous material, it is cured. It is of advantage to dry the material before curing, advantageously at room temperature or by heating to a temperature at which as yet no substantial curing occurs, e.g. to a temperature below 100° C.

The color fixation is advantageously performed in the usual apparatus, with or without nozzle device, by simple steaming for an appropriate length of time at the requisite temperature. For example, the steaming operation may be carried out at a temperature ranging between 101–107° C. and preferably at about 102° C. for about ½–12 minutes and preferably about 8 minutes. Steaming is then followed by a heat treatment preferably at a range from about 193° C. to about 213° C. The length of time of this subsequent heating operation may also be varied, e.g. from about 15 seconds to 350 seconds, inversely to the temperature employed. This second heating step may be with dry heat, such as hot air, or dry steam under pressure. It is preferred to use hot air since the process provides continuous operation. The last step of curing may alternatively be performed with infra-red rays. Finally, color fixation may also be performed without preliminary drying, in which case the drying and curing take place simultaneously and, under certain conditions, may be achieved without using steam.

Depending on whether the aqueous preparation contains further ingredients, it is possible to produce by the present process additional effects, for example, crease resistance, shrink resistance, permanent calender effects, modifications of the handling of the textile material or its hydrophobization.

To remove any unfixed dyestuff, it can be of advantage to aftertreat the fibrous material in the usual manner after curing, for example, by a treatment at 60° to 100° C. in a solution which contains a fixed alkali and a synthetic surfactant, for example, a condensation product of ethylene oxide with stearylamine and finally by rinsing with warm and cold water. The removing of unfixed dyestuff may also be achieved by simply rinsing the dried material with cold, then with boiling, and finally again with cold water.

The fibers to which the present process is applied are blends of synthetic polymeric polyesters and cellulosic fibers. By the former ones there are meant and included those highly polymeric linear polyesters, the molecules of which have recurring monomeric units connected by ester linkages. Dibasic acids, e.g. aromatic acids, such as terephthalic acid, diphenyl-4,4'-di-carboxylic acid and/or diphenylsulfone-4,4'-dicarboxylic acid, and glycols, e.g. ethylene glycol, diethylene glycol, triethylene glycol, propylene glycol, and/or butylene glycol, as well as other diols, e.g. 1,4-cyclohexyldiol may be used as the monomers to form the polymeric polyesters. The term cellulosic fibers includes native cellulose, as e.g. linen or particularly cotton, as well as regenerated cellulose, as e.g. viscose, high modulus polynosic viscose or cuprammonium rayon.

The ratio by weight between the two fibers may vary between a wide range, e.g. 25% polyester and 75% cellulose to 40% polyester and 60% cellulose, but preferably it is 65% to 35% or 50% to 50%. Typical commercial examples of such fibers are e.g. Dacron, Terylene, Fortrel, Trevira, Terlanca, Kodel, Vycron, etc. They are covered by many patents, e.g. British Patents, Nos. 578,079, 579,462, 588,411, 588,497, 596,688 and U.S. Patent No. 2,901,466.

The dyestuff mixtures used in the new process consist of disperse dyestuffs on the one hand and water-soluble reactive dyestuffs on the other hand. As disperse dyestuffs or dispersion dyestuffs, e.g. dyestuffs of the azo, azomethine, anthraquinone series as well as other dyes are useful. A definition of dispersion dyestuffs will be found on page 167 of the book of H. A. Lubs, "The Chemistry of Synthetic Dyes and Pigments," Reinhold Publishing Corporation, New York, 1955, and a list of such dyes are given in the book of Th. Vickerstaff, "The Physical Chemistry of Dyeing," Oliver and Boyd, London, 1954, pages 258 to 274.

As known, disperse dyes are advantageously used in a finely divided form, and dyeing is carried out in the presence of dispersing agents, e.g. soap, sulfite cellulose waste liquor or synthetic detergents, or a combination of different wetting and dispersing agents. Before dyeing, it is advantageous to convert the dyestuff to be used into a dyeing preparation that contains a dispersing agent and a finely divided dyestuff in such form that a fine dispersion is formed when the said dyestuff preparation is diluted with water. Such dyestuff preparations can be made in known manner, e.g. by reprecipitating the dyestuff from sulfuric acid and grinding the suspension so obtained with sulfite waste liquor, and also, if necessary, by grinding the dyestuff in a highly effective grinding device in the dry state, or in the wet state, with or without the addition of dispersing agent.

By reactive dyestuffs there are meant dyestuffs containing a group capable of reacting with the hydroxyl groups of the cellulosic fibers with the formation of a covalent chemical bond. As reactive groups in this connection there may be mentioned the ethyleneimino group, the fluorosulfonyl group, the isothiocyanate group, carbamic acid aryl ester groups, the propiolic acid amide group, the acrylamino group, the vinylsulfone group, and especially groups containing labile substituents which can easily be split off with the taking up of the electron pair of the bond, for example, aliphatically bound sulfuric acid ester groups and more especially aliphatically bound sulfonyloxy groups and halogen atoms, especially an aliphatically bound chlorine atom. Advantageously these labile substituents are present in the γ- or β-position of an aliphatic radical which is bound to the dyestuff molecule directly or through an amino, sulfone or sulfonic acid amide group, as e.g. in the β-sulfatoethylsulfone group or the sulfonic acid-N-β-chloro (or β-sulfato) ethylamide group. In the case of those dyestuffs which contain halogen atoms as labile substituents, such exchangeable halogen atoms may also be present in an aliphatic acyl radical, for example, an acetyl radical, or in the β-position or the α- and β-position of a propionyl radical, as e.g. in the β-chloropropionylamino group, or advantageously in a heterocyclic radical, for example, in a phthalazine, chinazoline, chinoxaline, pyrimidine or preferably a triazine ring. The dyestuffs and dyestuff formers advantageously contain a dichloropyrimidine or a trichloropyrimidine grouping or especially a chlorotriazine grouping of the formula (1)
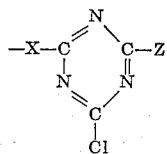

in which X represents a nitrogen bridge, and Z represents an advantageously substituted amino group, a substituted hydroxyl or mercapto group or a chlorine atom or an alkyl, aryl or aralkyl group.

Of special interest are dyestuffs which contain a grouping of the formula (2)
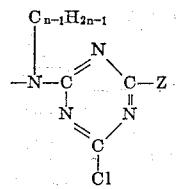

in which $n$ represents a positive whole number not greater than 4 and Z and has the meaning given above.

The reactive groups mentioned above may be formed on the dyestuff molecule by methods known, e.g. by condensation, or they can already be present in the dyestuff components used for the synthesis of the dyestuffs, e.g. by diazotization and coupling.

A very wide variety of organic dyestuffs or their intermediates, respectively, can be used, for example, oxazine dyestuffs, triphenylmethane dyestuffs, xanthene dyestuffs, nitro-dyestuffs, acridone dyestuffs, perinone dyestuffs and especially azo-dyestuffs, anthraquinone dyestuffs, phthalocyanine dyestuffs and peridicarboxylic acid amide dyestuffs.

The azo dyes represent the largest class of dyestuffs and the class giving the greatest flexibility in structure and color. There can be used in the dyestuffs of our invention all the variations of azo dyes known, such as the monoazo dyes, the disazo, the triazo, the tetrakisazo, the mordant dyes, the stilbene dyes, the pyrazolone and thiazole dyes, and the like, including not only metal-free dyestuffs, but also metal-complexes, e.g. 1:2-cobalt, 1:2-chromium, 1:1-copper or 1:1-nickel complexes. Azo dyes are described in the book of K. Venkataraman, "The Chemistry of Synthetic Dyes," Academic Press, New York, 1952, chapters 11–22, inclusive, pages 409–704.

Various anthraquinone and other polyquinoid dyestuffs are described in Venkataraman, chapters 27–34, inclusive, pages 803–1058. This group of dyestuffs encompasses the vat dyestuffs. Many of them contain water-solubilizing groups or groups convertible into water-solubilizing groups. Among the anthraquinone dyestuffs there may be mentioned more especially dyestuffs derived from 1:4-diaminoanthraquinone-2-sulfonic acid. The manufacture of these and other anthraquinone dyestuffs is described, e.g. in French Patent No. 1,182,124.

Phthalocyanine dyestuffs are described in Venkataraman, chapter 38, pages 1118–1142. As suitable phthalocyanine dyestuffs there may be mentioned more especially those derived from phthalocyanine sulfonic acid amides, which contain at least two free sulfonic acid groups and contain in at least one sulfonamide radical a group containing at least one labile halogen atom. The manufacture of such dyestuffs is described in French Patent No. 1,181,249.

It has been found that the dyeings so obtained on blended fabrics exhibit brilliant color, strong shade and crock resistance, excellent wash and perspiration fastness, outstanding fastness to light and sublimation, and also excellent fastness to spot- and commercial dry-cleaning. They do not display the scorching and yellowing usually brought about during heat treatment at elevated temperatures in the presence of urea and alkali, which causes dulling of colorings. The new process also eliminates the need for using carriers for the disperse dyes to facilitate diffusion into the polyester fiber. Such carriers often have adverse effects, such as reducing light fastness of the dye and present problems in eliminating the carriers from the fiber substrate after the coloring operation. The new process is especially suitable for coloring blends containing regenerated cellulose and its advantages are most noticeable when steaming at atmospheric pressure is used as the media for the development. A further advantage of the new coloring process is that the padding solutions or printing pastes, respectively, are stable and, therefore, can be prepared ahead of impregnation, or the impregnated goods can be stored before further processing. They can also be overprinted afterwards and the dyed ground shade and the overprint developed simultaneously.

Unless otherwise indicated, parts and percentages in the following examples are by weight and the temperatures in degrees centigrade.

*Example 1*

A stock emulsion containing:

| | Parts |
|---|---|
| Water | 722.1 |
| Sodium-O-phenylphenolate | 0.1 |
| Di-ammonium phosphate | 3.3 |
| Sodium trichloroacetate, 94% | 27.8 |
| Sodium meta-nitrobenzene sulfonate | 8.3 |
| 7.5% solution of the adduct of 80 mols of ethyleneoxide and 1 mol of oleylalcohol, cross-linked with 1% of hexamethylene-diisocyanate-(1,6) | 41.7 |
| Aliphatic hydrocarbon solvent of boiling range from 157°–200° (white mineral spirits; Varsol No. 2) | 102.5 |
| Low viscosity sodium alginate | 16.6 |
| Carboxy methylated locust bean gum | 22.3 |
| Urea | 55.3 |
| | 1000.0 | is prepared by dissolving in the required amount of water the first four chemicals in the sequence of the recipe. After these are dissolved the 7.5% solution of the nonionic dispersant is added on a high speed mixer, and the white mineral spirits in slowly added. Then the dry thickeners and finally the urea are added to the emulsion.

3 parts of the disperse dyestuff of the formula

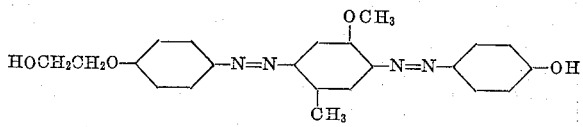

and 3 parts of the reactive dyestuff of the formula

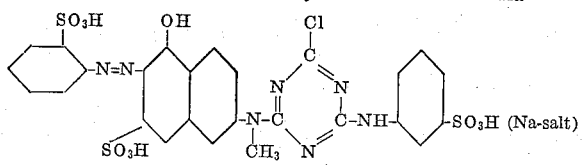

are sprinkled into 90 parts of the stock emulsion obtained as described above. Then 4 parts of water are added and the whole is mixed with a high speed mixing device to make 100 parts of a print emulsion paste. This printing paste is applied by conventional printing to a properly prepared blend fabric of 65% polyester fiber from ethyleneglycol and terephthalic acid and 35% cotton. The resulting print is dried and developed by steaming during one minute at 101°. Then it is cured in dry heat for one minute at 220°. Subsequently the printed fabric is rinsed in cold water, then in boiling water, and finally dried. A bright orange-colored union print with excellent fastness properties results.

Example 2

A stock emulsion containing:

| | Parts |
|---|---|
| Water | 611.5 |
| Sodium-O-phenylphenolate | 0.1 |
| Di-ammonium phosphate | 3.3 |
| Sodium trichloroacetate, 94% | 27.8 |
| Sodium meta-nitrobenzene sulfonate | 8.3 |
| 7.5% solution of the adduct of 80 mols of ethyleneoxide and 1 mol of oleylalcohol, cross-linked with 1% of hexamethylene-diisocyanate-(1,6) | 41.7 |
| Aliphatic hydrocarbon solvent of boiling range from 157°–200° (white mineral spirits; Varsol No. 2) | 102.5 |
| Low viscosity sodium alginate | 16.6 |
| Carboxy methylated locust bean gum | 22.3 |
| Urea | 165.9 |
| | 1000.0 | is prepared by dissolving in the required amount of water the first four chemicals in the sequence of the recipe. After these are dissolved, the 7.5% solution of the nonionic dispersant is added on a high speed mixer, and the white mineral spirits is slowly added. Then the dry thickeners and finally the urea are added to the emulsion.

3 parts of a mixture of about equal parts of the disperse dyestuffs of the formulae

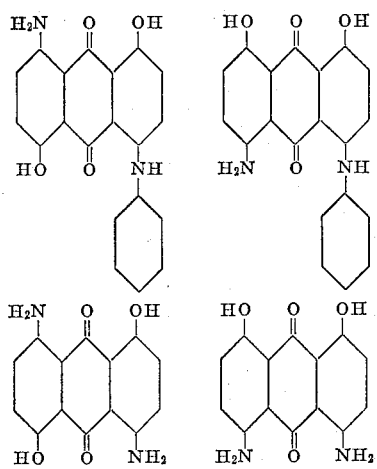

and 2 parts of the reactive dyestuff of the formula

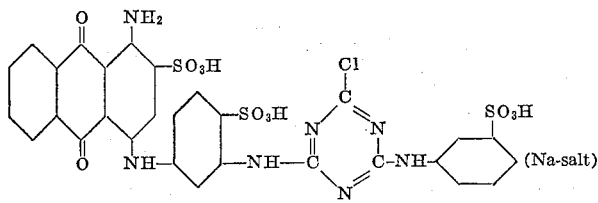

and 1 part of the reactive dyestuff of the formula

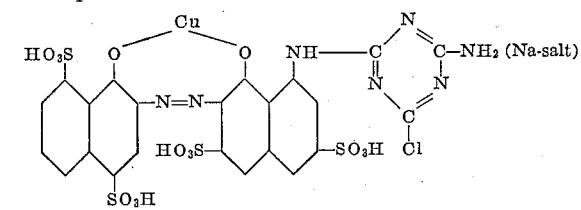

are sprinkled into 90 parts of the stock emulsion obtained as described above. Then 4 parts of water are added and the whole mixed with a high speed mixing device to make 100 parts of a print emulsion paste.

This print is applied by conventional printing to a properly prepared blend fabric of 50% polyester fiber from 1,4-cyclohexyldiol and terephthalic acid and 50% high modulus viscose rayon. The resulting print is dried and developed by steaming during 8 minutes at 201°. Then it is cured in dry heat during 2 minutes at 215°. Subsequently, the printed fabric is rinsed in cold water, then in boiling water, and finally dried. A rich navy blue-colored union print with excellent fastness properties results. If instead of the above-mentioned 10 parts of disperse dyestuff, reactive dyestuff and water, 6.7 parts of the disperse dyestuff described in the Color Index, No. 62030 (Disperse Violet 8), and 3.3 parts of the reactive dyestuff of the last formula given above (Copper Complex) are used, a full bluish violet-colored union print with excellent fastness properties is obtained.

Example 3

A dyebath is prepared as follows:

14 parts of the disperse dyestuff of the formula

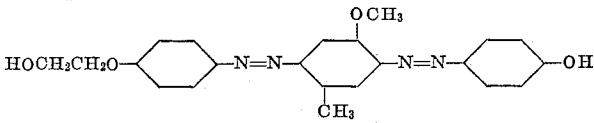

are dispersed in 200 parts of water at 40°, and 10 parts of the reactive dyestuff of the formula

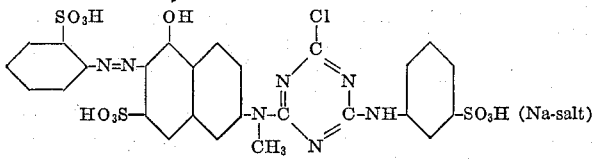

are dissolved in 100 parts of water at boiling temperature. The above solutions are then added to a solution containing 40 parts of sodium trichloroacetate in 536 parts of water. Finally 100 parts of a 4% sodium alginate solution of medium viscosity are added and the resulting 1000 parts of pad liquor are brought to a temperature of 49°.

This pad liquor is then applied by conventional padding methods on a properly prepared fabric of 65% polyester fabric from ethyleneglycol and terephthalic acid and 35% cotton.

The padded material is then dried and developed by steaming during 10 minutes at 102° and by following dry heat curing during 1 minute at 205°. Subsequently, the dyed fabric is rinsed in cold and then in boiling water and finally dried. A bright orange-colored union dyeing with excellent fastness properties results.

What is claimed is:

1. A new coloring process for mixed textile materials comprising fibers of synthetic polymeric linear polyester materials and fibers of polyhydroxylated materials, which comprises applying thereto a coloring composition containing a disperse dye capable of dyeing the polyester fiber, a water-soluble reactive dye containing a reactive group capable of reacting with the polyhydroxylated fiber, an adduct of ethylene oxide and high molecular weight aliphatic alcohol cross-linked with a substituted isocyanate, and the salt of an at least di-α-halogenated lower alkanoic acid and subsequently subjecting the fiber to the action of heat in order to fix the dyestuff on the fiber blend.

2. A coloring process as claimed in claim 1, wherein the salt of an at least di-α-halogenated lower alkanoic acid is an alkali metal salt of a trihalogenoacetic acid.

3. A coloring process as claimed in claim 1, wherein the salt of an at least di-α-halogenated lower alkanoic acid is the sodium salt of trichloroacetic acid.

4. A coloring process as claimed in claim 1, wherein the water-soluble reactive dyestuff contains a radical selected from the group consisting of an at least monohalogenated triazinylamino radical, an at least dihalogenated pyrimidylamino radical, a β-sulfatoethylsulfone radical, a sulfonic acid-N-β-sulfatoethylamide radical, an acrylamino radical and a β-halogenopropionylamino radical.

5. A printing process as claimed in claim 1, wherein the printing paste contains a disperse dyestuff of the anthraquinone or azoic series, a water-soluble reactive dyestuff containing a monochlorotriazinylamino group, the sodium salt of trichloroacetic acid and the adduct of 80 mols of ethyleneoxide and 1 mol of oleylalcohol, crosslinked with 1% of hexamethylenediisocyanate-(1,6).

6. A coloring process as claimed in claim 1, wherein the action of heat comprises a subjection to steam of at least one minute and at most ten minutes at a temperature of at least 100° C. and a most 103° C. and a subsequent subjection to hot air at a temperature of at least 196° C. and at most 213° C. and for an exposure time of at least one minute and at most five minutes.

References Cited by the Examiner

UNITED STATES PATENTS

| | | | |
|---|---|---|---|
| 3,084,016 | 4/1963 | Dawson | 8—1.246 |
| 3,097,910 | 7/1963 | Andrew | 8—55 |
| 3,114,754 | 12/1963 | Lodge | 8—55 |
| 3,137,687 | 6/1964 | Spoérri et al. | 8—21 X |
| 3,164,436 | 1/1965 | Altermatt | 8—21 X |

FOREIGN PATENTS 214,500   4/1958   Australia.

OTHER REFERENCES

Schmidlin: Preparation and Dyeing of Synthetic Fibers, pub. 1963, by Chapman & Hall Ltd., pp. 400–406.

Schmidlin: Vorbehandling and Farben Von Synthetischen Faserstoffen, pub. 1958, pp. 296 and 297.

NORMAN G. TORCHIN, *Primary Examiner.*

ALEXANDER D. RICCI, D. LEVY, J. HERBERT, *Assistant Examiners.*